(12) United States Patent
Filho et al.

(10) Patent No.: US 7,464,148 B1
(45) Date of Patent: Dec. 9, 2008

(54) NETWORK SINGLE ENTRY POINT FOR SUBSCRIBER MANAGEMENT

(75) Inventors: Wladimir de Lara Araujo Filho, Ottawa (CA); Sherine El-Medani, Ottawa (CA); Martin Bokaemper, Nepean (CA)

(73) Assignee: Juniper Networks, Inc., Sunnyvale, CA (US)

( * ) Notice: Subject to any disclaimer, the term of this patent is extended or adjusted under 35 U.S.C. 154(b) by 878 days.

(21) Appl. No.: 10/766,962

(22) Filed: Jan. 30, 2004

(51) Int. Cl.
*G06F 15/173* (2006.01)
*G06F 15/16* (2006.01)

(52) U.S. Cl. .................. 709/223; 709/224; 709/225; 709/202

(58) Field of Classification Search ............. 709/223, 709/225, 224, 202
See application file for complete search history.

(56) References Cited

U.S. PATENT DOCUMENTS

| | | | |
|---|---|---|---|
| 6,487,594 B1* | 11/2002 | Bahlmann | 709/225 |
| 6,556,996 B1* | 4/2003 | Kovarik et al. | 707/10 |
| 6,856,676 B1* | 2/2005 | Pirot et al. | 379/201.01 |
| 6,950,876 B2* | 9/2005 | Bright et al. | 709/230 |
| 6,996,076 B1* | 2/2006 | Forbes et al. | 370/310 |
| 7,039,037 B2* | 5/2006 | Wang et al. | 370/349 |
| 7,197,125 B1* | 3/2007 | Prasad et al. | 379/201.02 |
| 7,237,025 B1* | 6/2007 | Albert et al. | 709/225 |
| 7,239,877 B2* | 7/2007 | Corneille et al. | 455/456.3 |
| 7,313,611 B1* | 12/2007 | Jacobs et al. | 709/223 |
| 2002/0167906 A1* | 11/2002 | La Porta et al. | 370/252 |
| 2002/0194244 A1* | 12/2002 | Raventos | 709/101 |
| 2003/0007621 A1* | 1/2003 | Graves et al. | 379/219 |
| 2003/0051037 A1* | 3/2003 | Sundaram et al. | 709/227 |
| 2003/0131075 A1* | 7/2003 | Bear et al. | 709/219 |
| 2003/0137991 A1* | 7/2003 | Doshi et al. | 370/466 |
| 2003/0145013 A1* | 7/2003 | Kovarik et al. | 707/100 |
| 2003/0172145 A1* | 9/2003 | Nguyen | 709/223 |
| 2003/0191781 A1* | 10/2003 | Civanlar et al. | 707/200 |
| 2003/0220872 A1* | 11/2003 | Chandrashekhar et al. | 705/40 |
| 2004/0088186 A1* | 5/2004 | Anvekar et al. | 705/1 |
| 2004/0177133 A1* | 9/2004 | Harrison et al. | 709/220 |
| 2004/0215711 A1* | 10/2004 | Martin et al. | 709/203 |
| 2005/0015491 A1* | 1/2005 | Koeppel | 709/226 |
| 2005/0015494 A1* | 1/2005 | Adamczyk et al. | 709/226 |
| 2005/0108423 A1* | 5/2005 | Centemeri | 709/237 |

* cited by examiner

*Primary Examiner*—Jeffrey Pwu
*Assistant Examiner*—Hieu T Hoang
(74) *Attorney, Agent, or Firm*—Harrity & Harrity, LLP

(57) ABSTRACT

A gateway may be used as a common entry point for a network. Subscribers may request network services through the gateway. The gateway may identify management entities that are appropriate for a particular subscriber's request by contacting a network information collector (NIC). The NIC may include one or more, possibly distributed, resolver components and information collection agents. The resolvers are responsible for the resolution process, which may be based on a resolution process that specifies resolution functions that are required to identify the management entities. The information collection agents may be customizable software agents that collect state information from other elements in the network.

24 Claims, 7 Drawing Sheets

NETWORK SINGLE ENTRY POINT FOR SUBSCRIBER MANAGEMENT

BACKGROUND OF THE INVENTION

A. Field of the Invention

This invention relates generally to communication networks, and more particularly, to the managing/provisioning of network services.

B. Description of Related Art

Communication networks, such as Internet Protocol (IP) based networks, can be large networks that are often maintained by network service providers. Typically, service providers sell services and bandwidth on their network to interested parties (e.g., end-users, corporations, etc.).

A typical IP network includes a number of network elements, such as routers, that act together to form the network. A router is a device that determines the next network element to which data units (e.g., packets) should be forwarded during their trip through the network. Modern routers often support a number of network features beyond basic routing of data units.

Network provisioning/managing may include the process of initially configuring or re-configuring the network elements to support a subscriber or a value-added service or technology for the subscriber. An initial step taken when configuring a network for a subscriber is to locate the applicable network resource that supports the subscriber. This can be a difficult task because subscribers are generally distributed in the network as are the network element(s) that manage the subscribers. Locating the appropriate network element(s) can be particularly difficult if the management entry point in the network is not part of the subscriber's network path.

Thus, there is a need in the art to efficiently locate network resource(s) corresponding to a subscriber when given identification information of the subscriber.

SUMMARY OF THE INVENTION

A first aspect consistent with the principles of the invention is directed to a device in a network comprising agents configured to collect information relating to other devices in the network and at least one resolver configured to identify, based on identification information of a subscriber, network resources that manage elements associated with the subscriber to implement network services for the subscriber. The resolver performs the identification of the network resources in accordance with a resolution process formed based on the information collected by the agents. The resolution process specifies a path from the identification information of the subscriber to the network resources.

A second aspect consistent with the principles of the invention is directed to a method implemented in a network. The method includes collecting information pertaining to different network devices via a set of collection agents, and identifying one or more of the network devices as network devices that provide services to a subscriber of the network based on information that identifies the subscriber and based on the collected information.

Yet another aspect consistent with the principles of the invention is directed to a system that includes a gateway and a network information collector (NIC). The gateway receives network service requests from subscribers in a network, at least some of the service requests requiring configuration of one or more network elements to satisfy the service request. The NIC identifies a management entity associated with the one or more network elements required to satisfy the service request. The NIC includes that collected information relating to a state of network elements. The collected information is used to identify the management entity.

Yet another aspect consistent with the principles of the invention is directed to a method of resolving a resolution request to identify a management resource. The method includes receiving a resolution request that includes an identification of a subscriber, performing a resolution process that specifies an ordering of functions required to satisfy the resolution request, selecting resolvers designed to perform the functions specified in the resolution process, and controlling the resolvers to perform the functions specified in the resolution process.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

Systems and methods consistent with the principles of the invention provide for a common management entry point into a network. A distributed customizable naming system collects information from various network element(s) and combines the information to provide a complete network picture that can be used to resolve a particular network element that services a particular subscriber. A resolution graph can be constructed that specifies the steps necessary to resolve the network element for the particular subscriber and based on the current status of the network. Steps in the resolution graph may be resolved locally or at remote entities.

The description to follow may use terms, such as "network service provider" and "subscriber" when describing certain entities in a network. Generally, a subscriber can include end-users, corporate entities, or other entities. The network service provider may own and maintain network equipment that may be used by the subscribers. A business partner may purchase services from one or more network service providers and sell the services to its users. Examples of such services might include Internet service, video-on-demand services, video conferencing services, firewall services, and gaming services.

Exemplary Network

Figure 1:
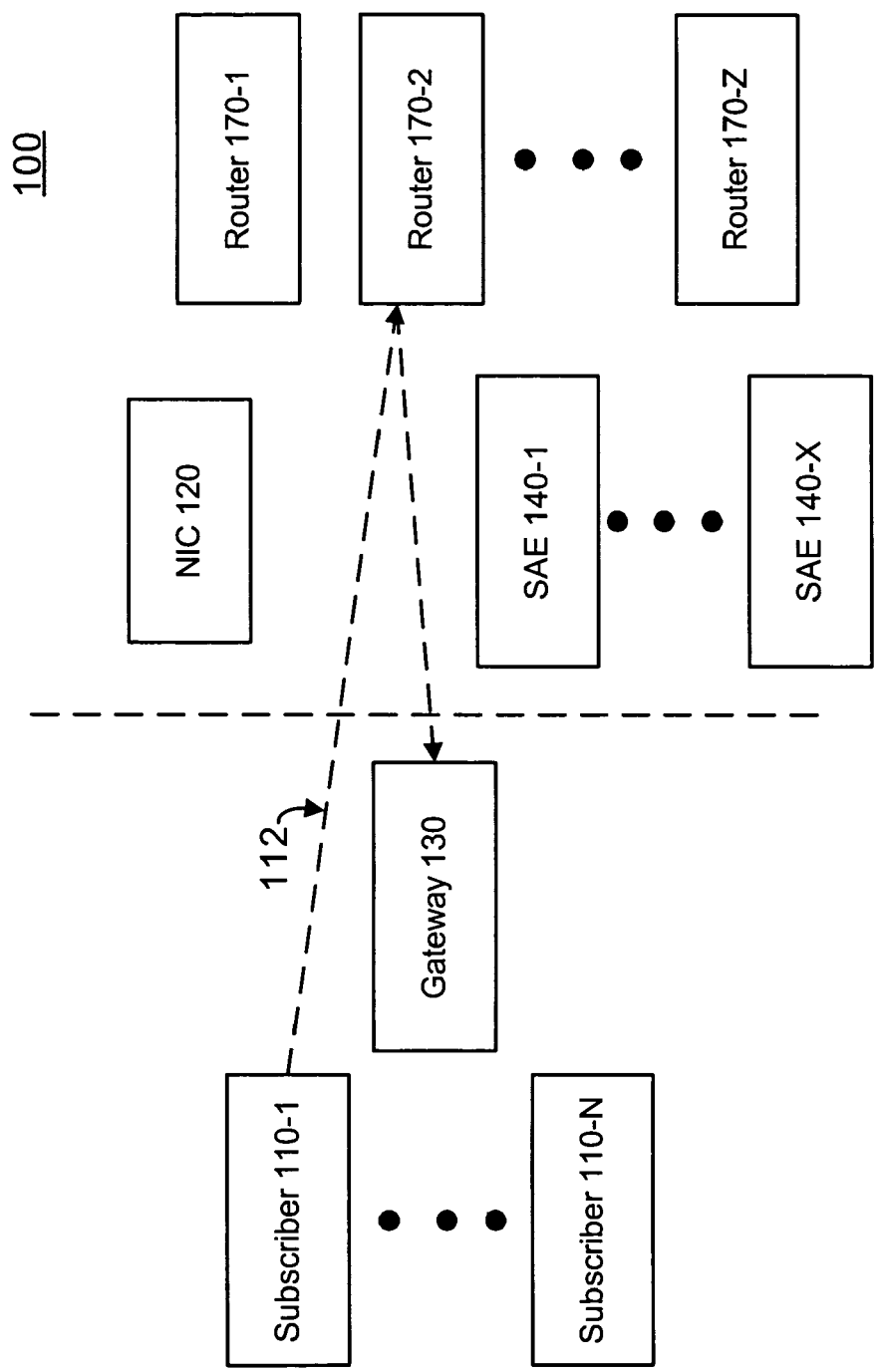
FIG. 1 is a diagram of an exemplary system in which systems and methods consistent with the principles of the invention may be implemented.

FIG. 1 is a diagram of an exemplary system in which systems and methods consistent with the principles of the invention may be implemented. As illustrated, network 100 may include a group of subscribers 110-1 through 110-N (collectively referred to as subscribers 110) that may connect to a network 100, through, for example, edge routers 170-1 through 170-Z (collectively referred to as routers 170). Network 100 may also include one or more network information collectors (NICs) 120 and one or more service activation engines (SAEs) 140-1 through 140-X (collectively referred to as SAEs 140).

The system shown in FIG. 1 may also include a gateway 130. Gateway 130 may be an entity that can be considered to be logically separate from network 100 but that provides a central connection point for managing network 100. Gateway 130 may be implemented, for example, as a web server with which subscribers 110 can communicate.

It will be appreciated that the number of devices illustrated in FIG. 1 is provided for simplicity. In practice, a typical system may include more or fewer components than illustrated in FIG. 1. Moreover, network 100 may include other components, such as additional network elements, that aid in the reception, processing, and/or transmission of data. It should be understood that although not shown, the devices of FIG. 1 are connected to each other either directly or indirectly through some form of communication medium.

Subscribers 110 may represent individual users that wish to connect to network 100. In this situation, subscribers 110 may use any device capable of transmitting and/or receiving data to connect to network 100. For example, subscribers 110 may use a personal computer, a laptop computer, a personal digital assistant (PDA), a television, a telephone device, a video game console, or the like, to connect to network 100. Subscribers 110 may connect to a network service provider's network via one or more routers 170. The subscribers may connect to the routers via many types of network links, such as wired, wireless, and/or optical connections, and subscribers 110 may connect using many types of network or network equipment, such as a cable modem network, a digital subscriber line access multiplexer (DSLAM), or the like. In other situations, an individual subscriber 110 may represent a corporate entity or other entity that provides and controls network access to a number of individual users.

Subscribers 110 may obtain advanced network services from network 100. The advanced network services may allow a subscriber to change their network experience both rapidly and dynamically (e.g., possibly on-the-fly) by, for example, requesting one or more SAEs 140 to control router(s) 170 to which the subscribers connect. Such network service requests may be made through gateway 130.

As an example of a service request, assume that subscriber 110-1 would like to initiate a connection with a video server (not shown) connected to network 100. Subscriber 110 would like to configure the appropriate routers 170 in network 100 such that the routers guarantee a quality of service (QoS) level needed to provide a stable video stream. Subscriber 110-1 may transmit this request, illustrated in FIG. 1 as dashed line 112, to gateway 130. Gateway 130 may then request that NIC 120 identify the router that will handle the user's request and the SAE assigned to manage the router. With this information, the appropriate SAE may be contacted and instructed to configure the router to implement the connection with the required QoS parameters.

Gateway 130

Gateway 130 may include gateway hardware and/or software that provides an interface between subscribers 110 and SAEs 140. Gateway 130 may provide a single point of contact through which subscribers 110 can invoke functionality of network 100. During operation, gateway 130 may receive requests from subscribers 110, determine an appropriate SAE 140 to which to forward the requests, forward the requests to the determined SAEs 140, and return responses to subscribers 110. A response returned to a subscriber 110 may indicate, for example, whether the request was successfully satisfied.

In one implementation, a single gateway 130 can be accessed by all subscribers 110 that wish to manage services in network 100. The single gateway can act as a combined portal for a number of different classes of network services, such as web services, voice over IP (VoIP) services, and media serving related services. In other implementations, multiple gateways 130 can be implemented, such as a gateway dedicated to VoIP and another gateway dedicated to being a media server.

SAEs 140

SAEs 140 may include computing devices that perform functions to deliver a requested service to a subscriber 110. In one implementation, SAEs 140 perform functions to configure one or more of routers 170 to deliver the requested service. In other words, SAEs 140 may act as managing entities for network elements such as routers 170. Each SAE 140 may be associated with certain routers 170 in network 100. Before gateway 130 can configure these routers, it must first generally identify the SAE 140 that is managing the router(s) 170 that will be implementing the service.

In some implementations, the functions of SAEs 140 may be merged with that of routers 170. Thus, in these implementations, when configuring a router 170, the router may be directly contacted.

NIC 120

As previously mentioned, when gateway 130 receives service requests from subscribers, it may need to determine the SAE 140 with which it needs to forward the service request. NIC 120 may include a set of distributed components in network 100 that interact together to identify the appropriate SAE 140. As used herein, this identification of the appropriate SAE 140 is referred to as "resolving" the request, and may be performed based on information, called a key, that uniquely identifies the requesting subscriber 110. The key may be, for example, the IP address of the subscriber 110.

Figure 2:
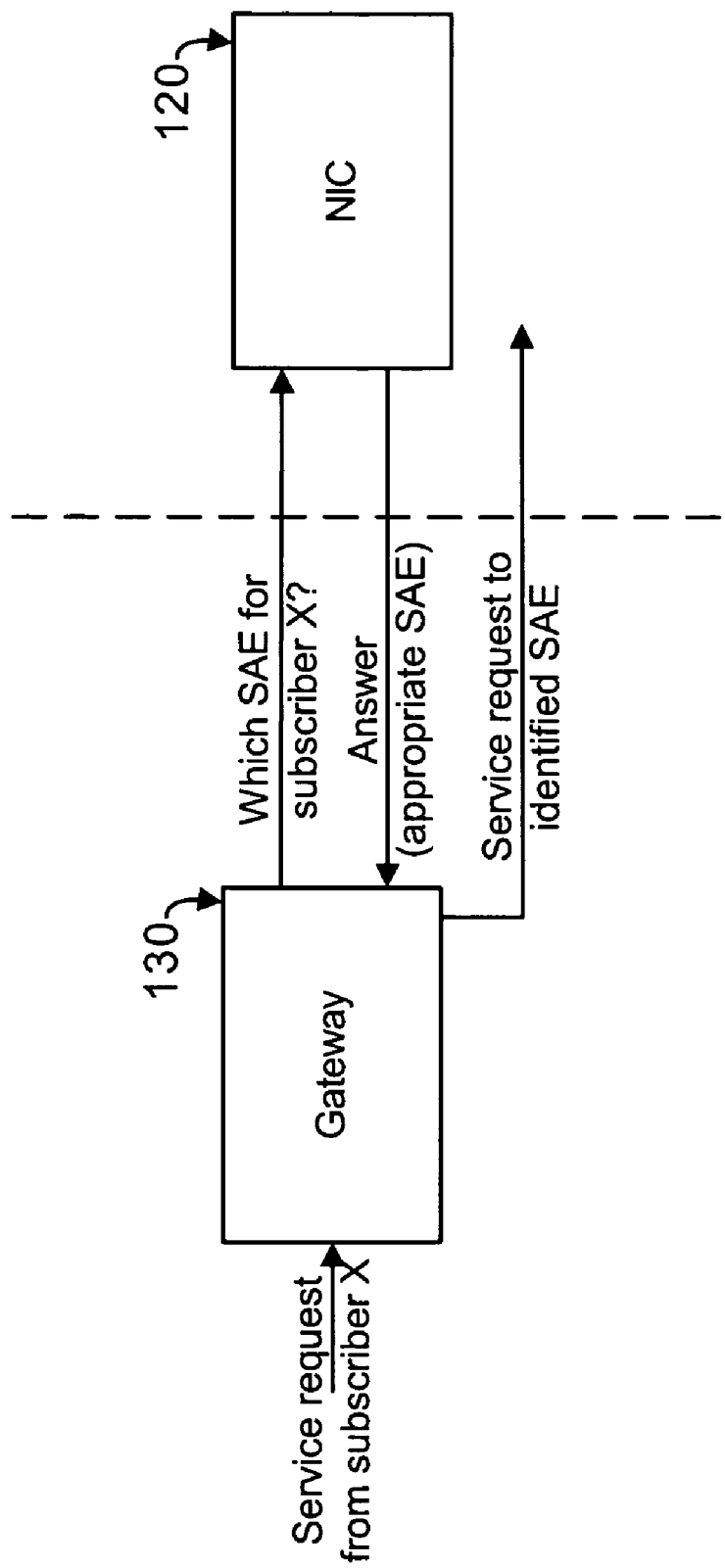
FIG. 2 is a diagram conceptually illustrating the interaction of the gateway and the NIC illustrated in FIG. 1.

FIG. 2 is a diagram conceptually illustrating the interaction of gateway 130 and NIC 120. Gateway 130 may receive a service request from a subscriber 110 (e.g., from a subscriber "X"). To implement the request, gateway 130 needs to know which SAE 140 controls the router that can implement the service requested by subscriber X. Accordingly, gateway 130 may submit a resolution request to NIC 120. NIC 120 may respond with information identifying the appropriate SAE 140, which gateway 130 may use to attempt to implement the subscriber's request. That is, gateway 130 may forward the service request to the identified SAE 140.

Figure 3:
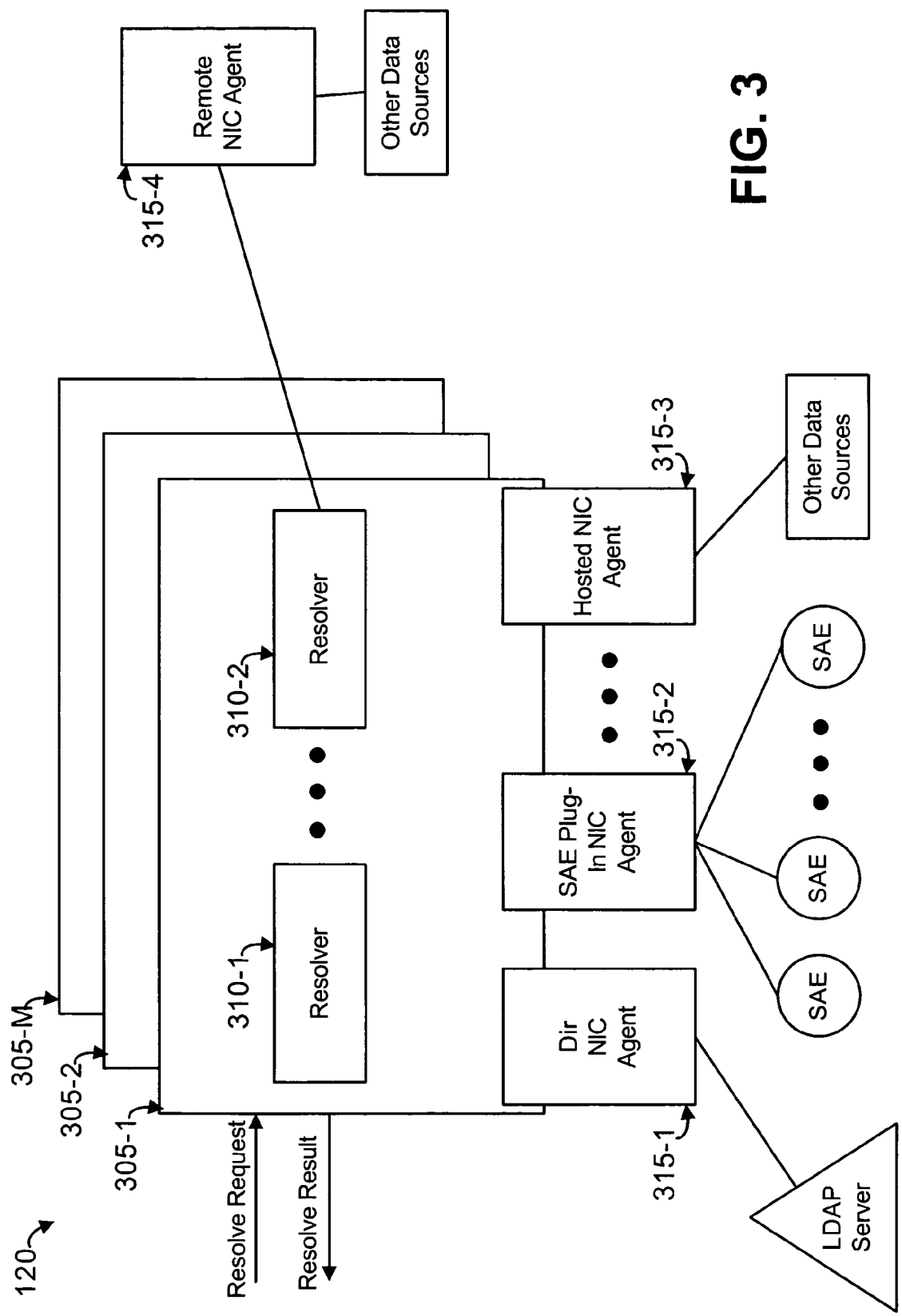
FIG. 3 is a diagram illustrating an exemplary implementation of the NIC in additional detail.

FIG. 3 is a diagram illustrating an exemplary implementation of NIC 120 in additional detail. As shown, NIC 120 may include one or more NIC hosts 305-1 through 305-M (collectively referred to as NIC hosts 305). NIC hosts 305 may be software components that are distributed in network 100. NIC hosts 305 provide the framework with which the substantive components of NIC 120 are implemented. More particularly, these substantive components of NIC host 305 may include resolvers 310-1 and 310-2, and agents 315-1, 315-2, 315-3, and 315-4. NIC hosts 305 may provide a standard set of services that are accessible by resolvers 310 and agents 315.

In general, resolvers 310 function as the intelligence of NIC 120. Resolvers are responsible for the resolution process. Resolvers may maintain the network information published by agents 315 or know how to contact agents 315 to get the information.

Agents 315 collect state information from other elements in network 100. These other elements may include, for example, SAEs 140, routers 170, Radius Servers (not shown), LDAP (Lightweight Directory Access Protocol) servers, or the like. Each of agents 315 may be specifically designed to collect information from a specific network element. For example, if an agent needs to communicate with an SAE 140, it may be implemented as an SAE plug-in (either as a hosted plug-in or a remote plug-in). As another example, if an agent 315 needs to read information from a directory server, it can be implemented as or include an LDAP client. Agents 315 may be implemented as "push" agents that automatically transmit information to hosts 305 or as "pull" agents that wait for a component on hosts 305 to request new information before transmitting.

In one implementation, agents 315 may run in one of two modes. In the first mode, the agent is a "hosted" agent that runs inside a host 305 and may make use of the standard set of services offered by host 305. In the second mode, the agent is a "remote" agent that runs at a physical location remote from the physical location at which its host is executing. In this mode, the agent may communicate with the host via a remote communication technique such as the Common Object Request Broker Architecture (CORBA), which is a well known architecture and specification for creating, distributing, and managing distributed program objects in a network.

In FIG. 3, agents 315-1, 315-2, and 315-3 are illustrated as hosted agents (first mode). Agent 315-1, for example, is an agent designed to interface with an LDAP server to obtain network directory information. Agent 315-2 is designed to communicate with SAEs 140. Agent 315-4 is illustrated as a remote agent (second mode). Agent 3154 may, for example, be hosted on a remote data source. NIC 120 may communicate with agent 315-4 via CORBA.

Agents 315 may be integrated within the framework of hosts 305 though well-defined interfaces. Depending on the amount of data and the frequency of its change, the agent's data can be actively pushed to the hosts or can reside on the agent and be retrieved on demand. Additionally, agents may be added or removed from the NIC 120 as needed. For example, new or changing network elements may be accommodated by adding agents 315 that are appropriately designed for the new network elements.

Communication Data Types

NIC 120, gateway 130, and subscribers 110 may communicate with one another using a predefined set of data types. These data types can also be used to define resolution graphs (discussed in more detail below). In some implementations, the set of data types can be extended to accommodate new data types. The new data types, once distributed to all the components in the system, can be used like any other data type, i.e., it can be employed in the resolution graph and can be used by agents 315.

Figure 4:
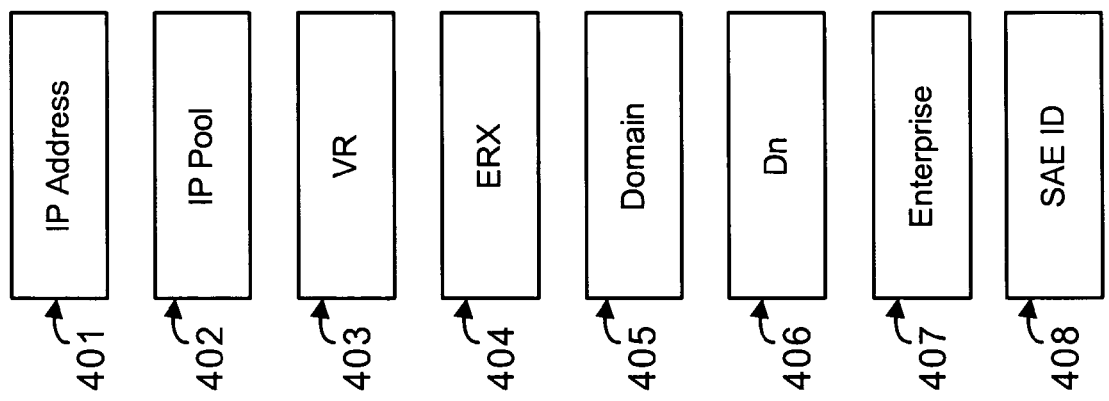
FIG. 4 is a diagram illustrating an exemplary set of data types.

FIG. 4 is a diagram illustrating an exemplary set of data types. IP address type 401 may represent a subscriber IP address. IP address type 401 may be formatted as a valid IP version 4 or IP version 6 address. IP pool type 402 represents an IP pool. An IP pool defines a range of IP addresses, which may be specified as a simple range or as a network with exclusions. VR type 403 represents a virtual router. The virtual router type 403 may be specified by the name of virtual router followed by the name of the virtual router that hosts the virtual router. For example, "vr1@erx1" represents the virtual router "vr1" located at router "erx1." ERX type 404 may represent a physical router, such as the edge router "erx1." Domain type 405 represents a domain, such as the domain "juniper.net." Dn type 406 may represent a directory distinguished name, and may be formatted as a valid directory distinguished name according to the LDAP specification. Enterprise type 407 may represent an enterprise distinguished name directory and SAE ID type 408 may identify one of SAEs 140.

Resolution Graph

As previously mentioned, the resolution process is defined via a resolution graph. A resolution graph is a directed graph that represents the information and the steps that should be taken starting from the key information (i.e., information identifying the subscriber that is to be resolved) to determine the appropriate goal (i.e., the SAE ID). A resolution graph may be constructed from static and dynamic information. Static information may represent the predefined properties of the system. Dynamic information can include the information collected by agents 315, and represents the dynamic state of the system.

Figure 5:
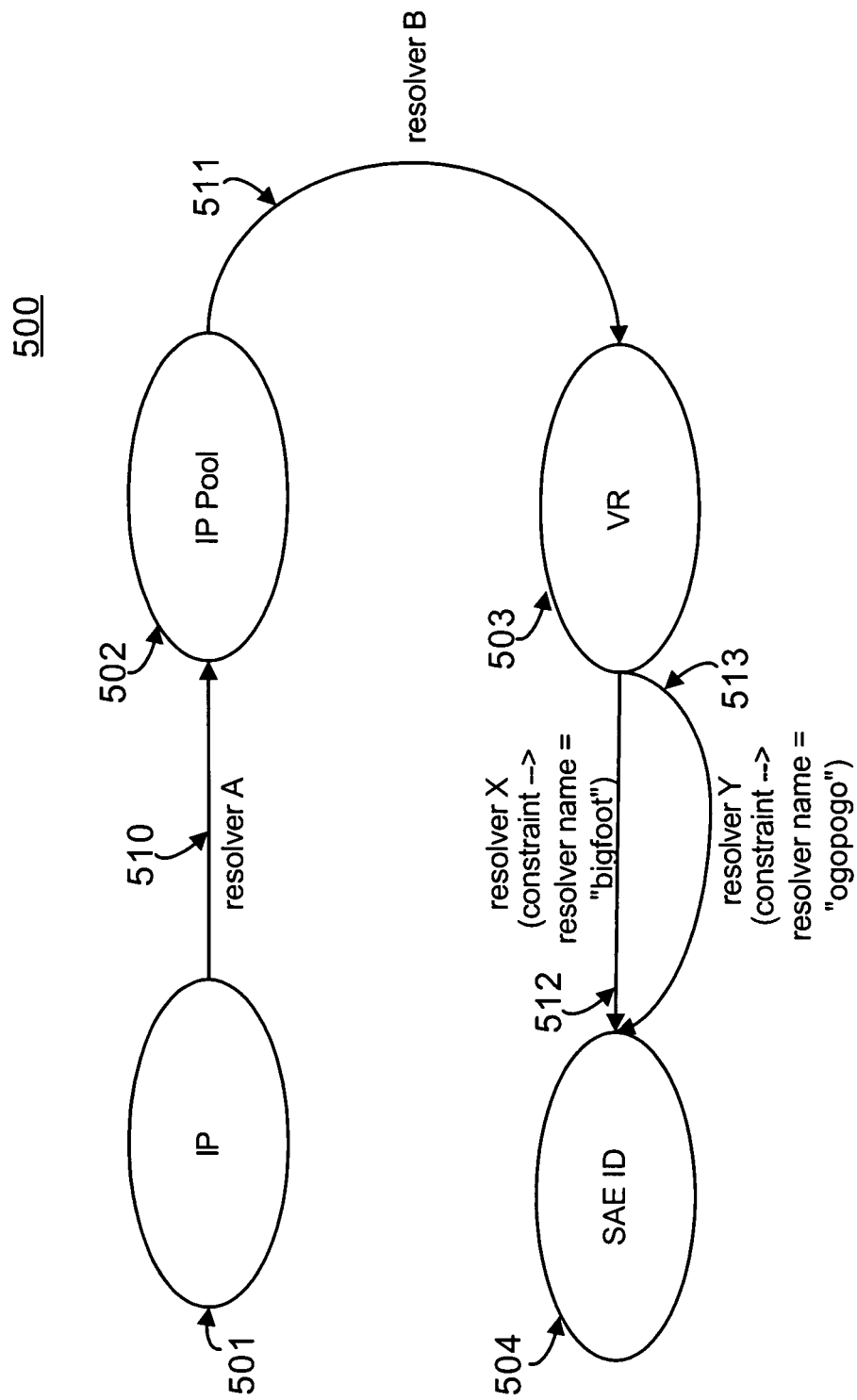
FIG. 5 is a diagram illustrating an exemplary resolution graph.

FIG. 5 is a diagram illustrating an exemplary resolution graph 500. Graph 500 includes vertices, such as vertices 501-504, edges, such as edges 510-513, and constraints. Vertices 501-504 represent the data types 400 that are involved in the resolution process. In the exemplary resolution graph shown in FIG. 5, vertex 501 includes IP address data type 401, vertex 502 includes IP pool data type 402, vertex 503 includes VR data type 403, and vertex 504 includes SAE ID data type 408. In other words, a resolution that proceeds according to resolution graph 500 would begin with an IP address. The IP address would be used to lookup the IP pool associated with the IP address, which would be used to determine the virtual router associated with the IP pool. The SAE associated with the virtual router would then be looked up to identify the SAE ID.

It should be understood that resolution graph 500 schematically represents the resolution process. It is not necessary that an actual graph be physically printed or otherwise generated.

Edges of resolution graph 500 represent resolvers 310 that can perform the mapping from the data type associated with the source vertex to the data type associated with the destination vertex. For example, if resolver "X" stores the mapping from virtual router names to the SAE managing the virtual router, edge 512 may represent resolver X. Edges 510-513 may each have a cost associated with the edge. In one implementation, the cost may be "one" if the resolver is available locally or "two" if the resolution requires a remote resolution. The edge costs can be used to prioritize which resolver is to perform the resolution when there are multiple edges between vertexes. In general, lower cost resolutions are preferred over higher cost resolutions.

Constraints are associated with edges 510-513 and are used to select which resolver should be contacted to perform the resolution. Constraints specify the prerequisites for traversing the edges.

To illustrate the concept of a constraint, consider the situation shown in FIG. 5, in which two edges, edges 512 and 513, connect vertex 503 to vertex 504. Edge 512 represents resolver X and edge 513 represents resolver Y, both of which are responsible for performing the mapping from virtual router names to the SAE managing the virtual router. Assume that resolver X performs its mapping for all virtual routers on the edge router "bigfoot" and resolver Y performs its mapping for all virtual routers on the edge router "ogopogo." Edge 512 (edge X) will then define the constraint "router name=bigfoot" and edge 513 (edge Y) will define the constraint "router name=ogopogo." An edge may only be traversed if its constraint is met. In some implementations, an edge can have multiple different constraints. In this situation, an edge is selected only when all the constraints are met.

In some implementations, constraints can additionally be classified as mandatory constraints and optional constraints. A mandatory constraint may be defined as a constraint that must be evaluated before traversing an edge. If the information required for evaluating the constraint is not available, the constraint is considered not met. For optional constraints, if the information required for evaluating the constraint is not available, the edge may still be traversed.

System Operation

Figure 6:
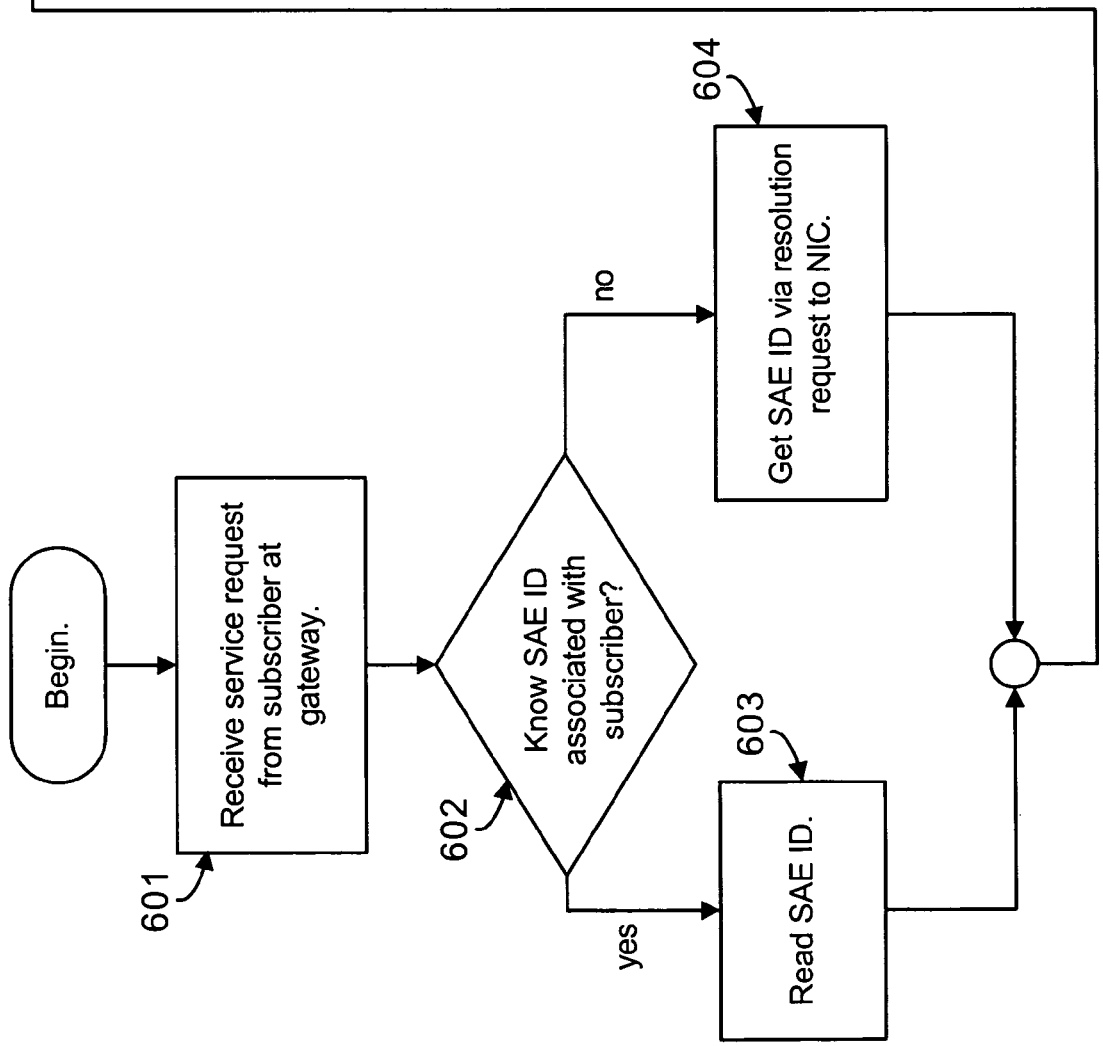
FIGS. 6 and 7 are flow charts illustrating exemplary operations performed consistent with aspects of the invention.

FIG. 6 is a flow chart illustrating exemplary operation of gateway 130 and NIC 120 consistent with aspects of the invention. A subscriber may begin by transmitting a request for a network service to gateway 130 (act 601). The request may include, in addition to the network service that is requested, a key that uniquely identifies the requesting subscriber (e.g., the subscriber's IP address). In this manner, gateway 130 can act as a single point of entry for all network service requests.

Gateway 130 may determine whether it knows the SAE ID associated with the key received from the subscriber (act 602). Gateway 130 may, for example, keep a cache of the results of previous resolution requests. Accordingly, act 602 may include consulting the cache to determine if the subscriber key has already been resolved. If so, gateway 130 may simply read the appropriate SAE ID from the cache and then transmit the service request to the appropriate SAE (acts 603 and 605). If, however, the key is not in the cache, gateway 130 may instead generate a resolution request to NIC 120 to obtain the SAE ID (act 604). After transmitting the service request to the appropriate SAE, gateway 130 may receive a response from the SAE relating to whether the service request was implemented (act 606). Gateway 130 may return the response to the requesting subscriber (act 607).

Figure 7:
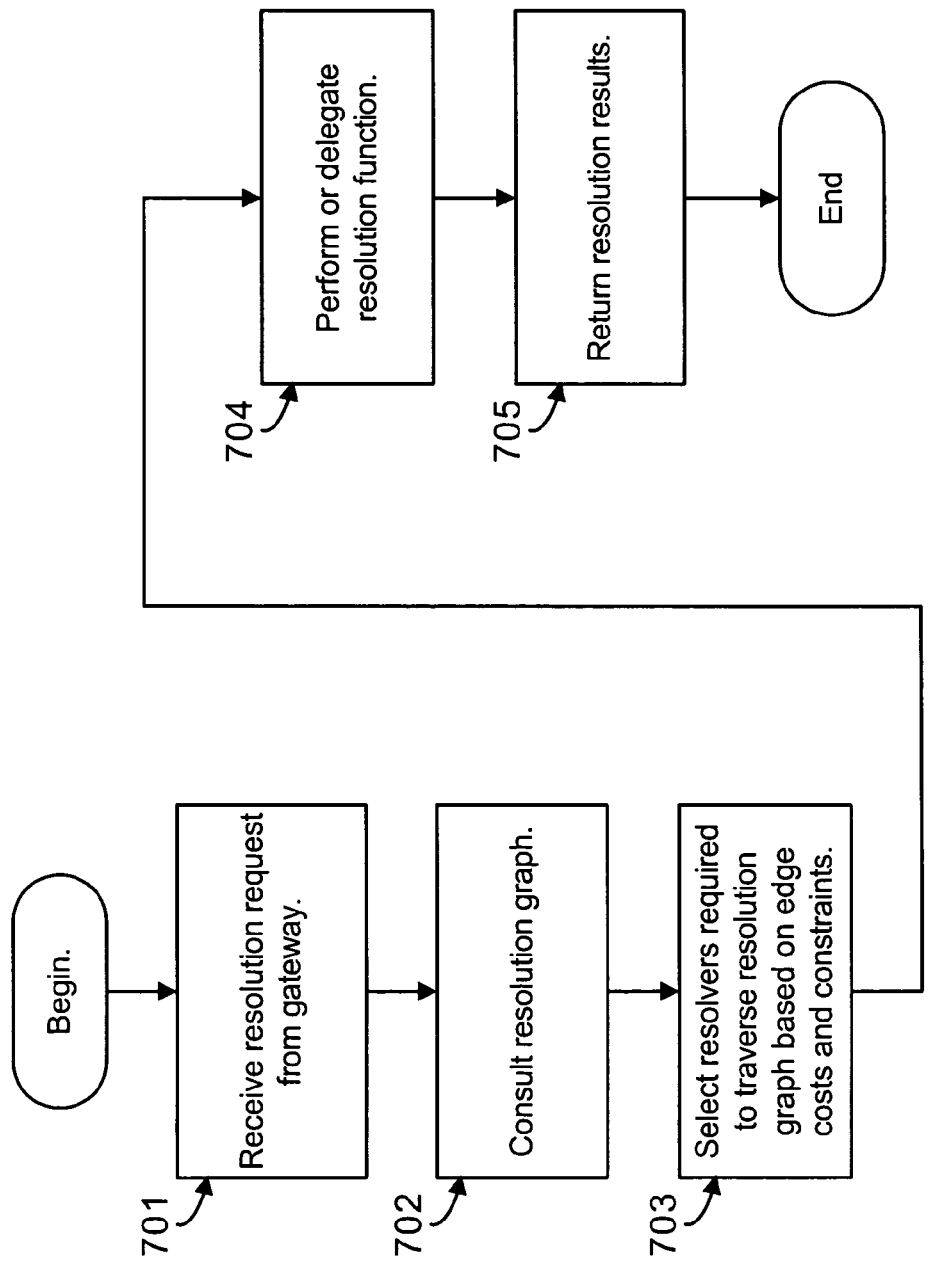

FIG. 7 is a diagram illustrating exemplary operation of NIC 120 consistent with aspects of the invention when implementing the resolution request performed in act 604. A resolver 310 at a host 305 may initially receive the resolution request (act 701). The resolution request includes the key identifying the subscriber. Starting from the key, the resolver may form a resolution plan by consulting a pre-constructed a resolution graph, such as graph 500, that leads to a completed resolution (act 702).

The resolution graph may be pre-constructed based on the functions (edges) and data types (vertices) available to resolver 310 in NIC 120. Some of the edges may be implemented by other resolvers in NIC 120, which may be local or remotely distributed in network 100. The resolution graph may vary depending on the functions available to the resolver. In some implementations, when the resolver determines that it lacks sufficient information to form a complete resolution graph, the resolver may request additional network state information from agents 315.

More particularly, the resolution graph may have been generally constructed as a two-part graph: a Meta graph and an Expanded graph. The Meta graph may be the portion of the resolution graph that can be constructed based on the configuration properties of the system, and may include the vertices and the roles of the edges. The Expanded graph may be constructed based on run-time system information, such as an indication of which resolvers are up and running and as well as dynamic constraint values for these resolvers. Together, the Meta graph and the Expanded graph form a complete resolution graph.

From the resolution graph, the resolver 310 may evaluate the constraints and costs associated with the graph to determine which other resolvers (if any) in NIC 120 will be used to perform the resolution (act 703). The resolver may then implement the functions in the resolution graph by either performing or delegating these functions to other resolvers (act 704). Finally, the resolver may return the resolved vertex (i.e., the SAE ID) to gateway 130.

CONCLUSION

Techniques are described above that use a gateway to act as a common management entry point into a network. Agents in a NIC gather state information relating to different network elements. The state information may then be used to flexibly resolve which network elements need to be contacted to provide a particular subscriber with a particular service.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while series of acts have been presented with respect to FIGS. 6 and 7, the order of the acts may be different in other implementations consistent with principles of the invention. Also, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. One or more devices in a network comprising:
   at least one storage device for storing computer instructions for implementing:
   agents configured to collect information relating to other devices in the network; and
   at least one resolver configured to contact the agents to obtain the collected information and configured to identify, based on identification information of a subscriber, a network resource that manages elements associated with the subscriber to implement network services for the subscriber, the at least one resolver identifying the network resource in accordance with a resolution process determined based on the information collected by the agents, the resolution process specifying a mapping from the identification information of the subscriber to the network resource, wherein, when identifying the network resource in accordance with the resolution process, the at least one resolver is part of a resolution graph defined by vertices representing network data types used by the at least one resolver and edges representing resolvers that can perform a mapping from a data type represented by a source vertex to another data type represented by a destination vertex, wherein the network data types comprise an Internet Protocol (IP) address, an IP pool, and a service activation engine identifier (ID).

2. The one or more devices of claim 1, further comprising:
a plurality of host components wherein each provides a framework for execution of the agents and the at least one resolver.

3. The one or more devices of claim 2, wherein the plurality of host components are distributed in the network.

4. The device of claim 1, wherein the other devices in the network include at least one of service activation engines, routers, Radius servers, or Lightweight Directory Access Protocol servers.

5. The device of claim 1, wherein the resolution graph is further defined by constraints that specify prerequisites for traversing the edges.

6. The device of claim 1, wherein the agents are dynamically added in response to the other devices being added to the network.

7. The device of claim 1, wherein the agents include at least one remote agent that executes on one of the other devices with which the agents collect information.

8. The device of claim 1, wherein the network resource that manages the elements comprises service activation engines.

9. The device of claim 1, wherein the network resource that manages the elements is implemented within routers.

10. The device of claim 1, wherein the agents push the collected information to the at least one resolver.

11. A method implemented in a network comprising:
collecting information pertaining to a plurality of different network devices via a set of collection agents;
identifying, using resolvers and a resolution graph defined by vertices representing network data types and edges representing the resolvers that can perform a mapping from a data type represented by a source vertex to another data type represented by a destination vertex, one of the plurality of different network devices as a network device that provides services to a subscriber of the network based on information that identifies the subscriber and based on the collected information, wherein the information that identifies the subscriber comprises an Internet Protocol (IP) address and wherein the identified network device comprises a service activation engine (SAE) that manages routing devices; and
specifying a mapping from the information that identifies the subscriber to the identified network device.

12. The method of claim 11, further comprising:
pushing the collected information to a network information collector (NIC).

13. The method of claim 11, further comprising:
transmitting the collected information to a network information collector (NIC) when the collected information is requested by the NIC.

14. The method of claim 11, wherein the collection agents are executed remotely at least one of the plurality of different network devices.

15. The method of claim 11, wherein the network device includes at least one of a Radius server or a Lightweight Directory Access Protocol (LDAP) server.

16. A system comprising:
a gateway, comprising hardware, configured to receive network service requests from or on behalf of subscribers in a network, at least some of the service requests requiring configuration of one or more routers to satisfy the service request;
a network information collector (NIC), coupled to the gateway, configured to identify a service activation engine associated with the one or more routers required to satisfy the at least some of the service requests, the NIC including:
at least one resolver configured to create a resolution graph and identify the service activation engine by traversing the resolution graph, wherein the resolution graph is defined by vertices representing network data types used by the at least one resolver and edges representing resolvers that can perform a mapping from a data type represented by a source vertex to another data type represented by a destination vertex, wherein the network data types comprise an Internet Protocol (IP) address, an IP pool, and a service activation engine identifier (ID); and
a plurality of agents, coupled to the NIC, configured to collect information relating to a state of the one or more routers, the collected information being used to identify the service activation engine.

17. The system of claim 16, further comprising:
a plurality of distributed resolvers.

18. The system of claim 16, wherein the resolution graph is formed based on the information collected by the plurality of agents.

19. The system of claim 16, wherein the resolution graph is further defined by constraints that specify prerequisites for traversing the edges.

20. A method of resolving a resolution request to identify a management resource, the method comprising:
receiving a resolution request that includes an identification of a subscriber;
performing a resolution process that specifies an ordering of functions required to satisfy the resolution request, including determining a mapping from the identification of the subscriber to the management resource, the resolution process comprising consulting a resolution graph, wherein the resolution graph includes:
vertices and edges, wherein the vertices represent network data types used by resolvers and the edges represent resolvers that perform a mapping from a data type represented by a source vertex to another data type represented by a destination vertex, wherein the network data types comprise an Internet Protocol (IP) address, an IP pool, and a service activation engine identifier (ID);
selecting resolvers designed to perform the functions specified in the resolution process; and
controlling the resolvers to perform the functions specified in the resolution process.

21. The method of claim 20, wherein the resolvers are distributed across different network elements in a network.

22. The method of claim 20, wherein selecting resolvers further includes:
  associating cost values with the edges of the resolution graph; and
  selecting edges based on the associated cost values.

23. The method of claim 22, wherein edges that are associated with remote resolvers are associated with higher cost values than edges associated with local resolvers.

24. The method of claim 20, wherein selecting resolvers further includes:
  associating constraints with the edges of the resolution graph that specify prerequisites for traversing the edges; and
  selecting edges based on the associated constraints.

* * * * *

UNITED STATES PATENT AND TRADEMARK OFFICE
CERTIFICATE OF CORRECTION

| | | |
|---|---|---|
| PATENT NO. | : 7,464,148 B1 | |
| APPLICATION NO. | : 10/766962 | |
| DATED | : December 9, 2008 | |
| INVENTOR(S) | : Wladimir de Lara Araujo Filho et al. | |

It is certified that error appears in the above-identified patent and that said Letters Patent is hereby corrected as shown below:

Column 9, line 66, reads "are executed remotely at least one of the plurality of different" and should be corrected as follows: "are executed remotely at at least one of the plurality of different"

Signed and Sealed this

Fourteenth Day of April, 2009

JOHN DOLL
*Acting Director of the United States Patent and Trademark Office*